(12) United States Patent
Paulsen-Dziuk et al.

(10) Patent No.: US 8,725,608 B2
(45) Date of Patent: May 13, 2014

(54) METHOD OF ASSISTED EDUCATION PLANNING

(75) Inventors: Janelle Denice Paulsen-Dziuk, Falls City, TX (US); Rennie Garcia, San Antonio, TX (US); Michael Anthony Moczygemba, San Antonio, TX (US); Maria Josefina Valdez, San Antonio, TX (US); Bolivar Cesar Lora, San Antonio, TX (US); Robert Anthony Pacheco, San Antonio, TX (US); Nora Anderson Reed, San Antonio, TX (US); Eileen Grace Hicks, San Antonio, TX (US); Dawn Love Cooper, Boerne, TX (US); Stuart Blain Parker, San Antonio, TX (US); Mark Steven Rapp, San Antonio, TX (US); Stacy Jo Clayton, San Antonio, TX (US); Steven Douglas Potter, San Antonio, TX (US); Kelley Kay Farwell, San Antonio, TX (US); Susan James Caudill, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2381 days.

(21) Appl. No.: 10/920,016

(22) Filed: Aug. 17, 2004

(65) Prior Publication Data

US 2005/0060253 A1    Mar. 17, 2005

Related U.S. Application Data

(60) Provisional application No. 60/496,490, filed on Aug. 20, 2003.

(51) Int. Cl.
G06Q 40/00 (2012.01)

(52) U.S. Cl.
CPC .................................. *G06Q 40/00* (2013.01)
USPC ........................................................ 705/35

(58) Field of Classification Search
None
See application file for complete search history.

(56) References Cited

U.S. PATENT DOCUMENTS

| | | | | | |
|---|---|---|---|---|---|
| 4,642,768 | A | * | 2/1987 | Roberts | 705/4 |
| 5,132,899 | A | * | 7/1992 | Fox | 705/36 R |
| 5,245,535 | A | * | 9/1993 | Weiss et al. | 705/36 R |
| 5,752,236 | A | * | 5/1998 | Sexton et al. | 705/4 |
| 5,819,263 | A | * | 10/1998 | Bromley et al. | 707/3 |
| 5,878,405 | A | * | 3/1999 | Grant et al. | 705/39 |
| 5,890,140 | A | * | 3/1999 | Clark et al. | 705/35 |

(Continued)

OTHER PUBLICATIONS website (no. author), "Welcome to College Savings Bank", Dec. 4, 2002, www.collegesavings.com/index.html also, related webpage www.collegesavings.com/reasearch.shtml.*

(Continued)

*Primary Examiner* — Bruce I Ebersman
(74) *Attorney, Agent, or Firm* — Kilpatrick Townsend & Stockton LLP

(57) ABSTRACT

A method of planning for an education with the assistance of a single source includes a user communicating with the single source for planning for multiple financial needs for an education, determining various insurance protection plans which are provided by the single source, selecting financing options for the education which are provided by the single source, obtaining spending tools which are provided by the single source, and procuring communications tools which are provided by the single source.

60 Claims, 18 Drawing Sheets

(56) References Cited

U.S. PATENT DOCUMENTS

| | | | |
|---|---|---|---|
| 5,918,217 A * | 6/1999 | Maggioncalda et al. | ... 705/36 R |
| 6,012,043 A * | 1/2000 | Albright et al. | 705/36 R |
| 6,073,119 A * | 6/2000 | Bornemisza-Wahr et al. | . 705/42 |
| 6,119,104 A * | 9/2000 | Brumbelow et al. | 705/35 |
| 7,062,462 B1 * | 6/2006 | Ireland et al. | 705/38 |
| 7,158,950 B2 * | 1/2007 | Snyder | 705/35 |
| 7,165,174 B1 * | 1/2007 | Ginter et al. | 713/153 |
| 7,171,384 B1 * | 1/2007 | Fitzpatrick et al. | 705/36 R |
| 7,370,004 B1 * | 5/2008 | Patel et al. | 705/14.37 |
| 7,376,613 B1 * | 5/2008 | Cofino et al. | 705/37 |
| 7,542,921 B1 * | 6/2009 | Hildreth | 705/26 |
| 2001/0031456 A1 * | 10/2001 | Cynaumon et al. | 434/350 |
| 2001/0032156 A1 * | 10/2001 | Candura et al. | 705/36 |
| 2002/0004782 A1 * | 1/2002 | Cincotta | 705/39 |
| 2002/0010599 A1 * | 1/2002 | Levison | 705/4 |
| 2002/0091608 A1 * | 7/2002 | Odegaard et al. | 705/36 |
| 2002/0152147 A1 * | 10/2002 | Shulman et al. | 705/35 |
| 2003/0028466 A1 * | 2/2003 | Jenson et al. | 705/36 |
| 2003/0105692 A1 * | 6/2003 | Gilbert et al. | 705/35 |
| 2003/0154097 A1 * | 8/2003 | Hartley et al. | 705/1 |
| 2003/0187768 A1 * | 10/2003 | Ryan et al. | 705/35 |
| 2003/0216965 A1 * | 11/2003 | Libman | 705/14 |
| 2004/0138913 A1 * | 7/2004 | Guerra | 705/1 |
| 2004/0230947 A1 * | 11/2004 | Bales et al. | 717/110 |
| 2004/0254927 A1 * | 12/2004 | Lang et al. | 707/5 |
| 2004/0267651 A1 * | 12/2004 | Jenson et al. | 705/36 |
| 2005/0171820 A1 * | 8/2005 | Snyder | 705/4 |

OTHER PUBLICATIONS website(no. author), "Cochran Insurance", Apr. 08, 2002, www.cochraninsurance.com/products.htm.*

Credit Care Center.com website. 2002, multiple tabs used, only main website pdf submitted (http://web.archive.org/web/20021016175325/www.creditcarecenter.com/banking/banking . . . Feb. 28, 2009.*

"US Today.com" Websites offer financial planning tools; 3 pages, McLean.*

* cited by examiner

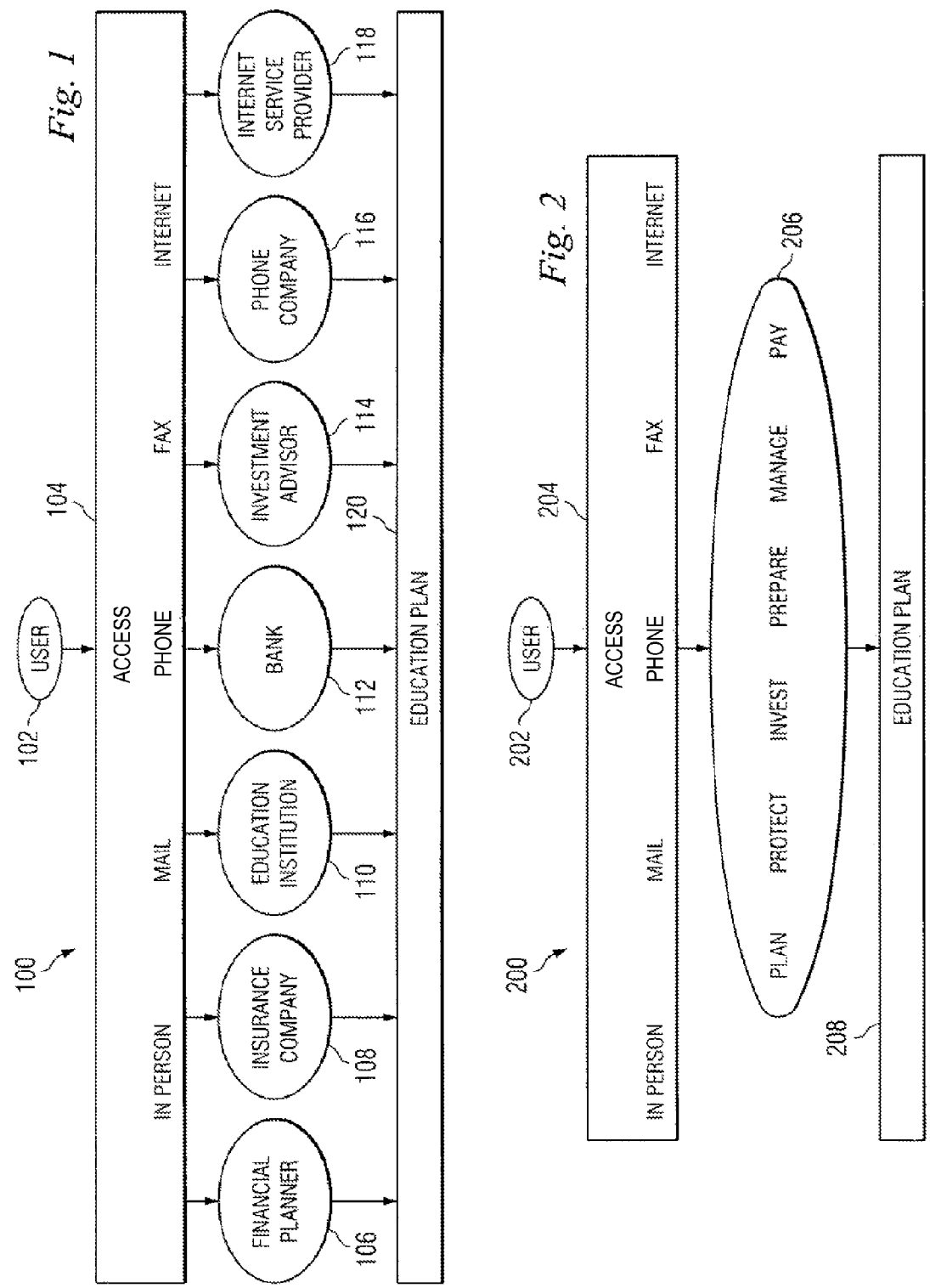

*Fig. 7*

| | | Accounts | Documents | Help | Log Off ☒ |
| HOME  INSURANCE  BANKING  INVESTMENTS  MEMBER SERVICES |

To Bottom ▽

Three Steps to Saving for College
Step 2: Your Saving Options ∼ 700

Getting Started is the Most Important Thing
The sooner you begin saving for your child's education, the more time your initial investment will have to grow. Any amount helps, no matter how small. Each dollar you set aside today is one less dollar you'll have to take out of your current income or borrow tomorrow.

Tools
- College Cost Calculator
- Education Funding Calculator

Available Options:
- 529 College Savings Plan ─ 702
- Coverdell Education Savings Account[1] ─ 704
- Custodial Accounts (UTMA/UGMA) ∼ 706
- Prepaid Tuition Plans ∼ 708

Need Help?
Talk with a representative toll-free.

Next:
Step 3: Protect Your Savings: Back up your plan.

Other Options:
- Return to College Start for Parents
- Return to College Start main page

[1] Formerly known as an Education IRA

FAQs  GLOSSARY  CONTACT US  HOME

To Top △

*Fig. 8*

Accounts | Documents | Help | Log Off ⊠

HOME    INSURANCE    BANKING    INVESTMENTS    MEMBER SERVICES

To Bottom ▽

Three Steps to Saving for College
Step 3: Protect Your Savings ~ 800

Are You Covered?
An illness, disability or death in the family could wipe out your college savings if you aren't properly protected with the right kinds of insurance coverage:

- Life insurance can provide the money your family will
802 ~ need if something should happen to you or your spouse before you've reached your college funding goal.
- Disability income protection safeguards your income in case you become ill or disabled. An individual disability
804 — income policy will help ensure you won't have to use college savings for unexpected medical expenses.

Other Options:
  • Return to College Start for Parents
  • Return to College Start main page Tools
• Life Insurance Needs Calculator
  \
  806

Need Help?
Talk with a representative toll-free.

FAQs  GLOSSARY  CONTACT US  HOME

To Top △

*Fig. 10*

Accounts | Documents | Help | Log Off ☒

HOME    INSURANCE    BANKING    INVESTMENTS    MEMBER SERVICES

To Bottom ▽

When It's Time to Pay for College
Other Financing Options ~1000

Put Your Home to Work For You —1002
What if your need is immediate and your savings are limited? A home-equity loan or line of credit to finance your child's education may be your solution.

See Also
- Loan interest rates
- Apply for a home equity loan or line of credit

Because these options are secured by the equity you have in your home, you may be able to deduct up to 100% of the interest you pay on the loan.

However, before you decide to take a loan against the equity in your home, consider the additional monthly costs and the length of time it will take to eliminate the debt.

You may find this new obligation could have an adverse affect on your ability to save for retirement or meet other financial obligations.

Home Equity Line of Credit —1004
A home equity line of credit provides credit when you need it with a variable interest rate. When you need additional funds, you can borrow again (up to your credit limit) simply by writing a check. In addition, as you repay some or the entire principal amount, that money is again available for your use.

Home Equity Loan —1006
Our fixed-rate home equity loan provides a one-time, lump-sum amount that can be used for college expenses. Loans can range from $6,500 to $350,000. Since the interest rate is fixed for the life of the loan, you'll get the convenience and security of a predictable monthly payment.

Next:
Consolidate Your Investments: Simplify your life

Other Options:
- Return to College Start for Parents
- Return to College Start main page FAQs  GLOSSARY  CONTACT US  HOME To Top △

TO Fig. 12b

FROM Fig. 12a

| | | |
|---|---|---|
| Coverdell Education Savings Accounts. ~1206 A tax-deferred account for educational expenses. Parents and grandparents can put away $2,000 per year per child. | • Since these accounts have a significant impact on financial aid, consider using them before assets held in your name. This can improve your child's chances of qualifying for financial aid in future years.<br>• You can buy a computer and software for your child as a qualified education expense.<br>• Change beneficiaries to other child if funds are not needed for the child going to college. | • For financial aid considerations, 35% of assets are considered available for college expenses.<br>• Qualified withdrawals are free from federal income taxes.<br>• There's a 10% percent penalty on investment earnings plus income taxes if not used for qualified education expenses. |
| Custodial Accounts (UGMA/UTMA). ~1208 These accounts, established under the Uniform Gift to Minors Act or the Uniform Transfers to Minors Act, are under a child's name and Social Security number, with a parent designated as custodian. | • Use before tax advantage savings.<br>• Since these accounts have a significant impact on financial aid, consider using them before assets held in your name. This can improve your child's chances of qualifying for financial aid in future years.<br>• If you have enough tax advantage savings to pay for college costs consider using UGMA/UTMA accounts to purchase essential non-education related items for your child (like clothing or a car). | • For financial aid considerations, 35% of assets are considered available for college expenses.<br>• Remember that depending on the state you live in, at age 18 or 21 your child has control over the account.<br>• Taxes are not deferred.<br>• All or some earnings are taxed at the child's rate. |
| Other Options:<br>• Return to College Start for Parents<br>• Return to College Start main page | | |

FAQs GLOSSARY CONTACT US HOME

To Top △

```
                                    Accounts | Documents | Help | Log Off  [X]
   HOME    INSURANCE    BANKING    INVESTMENTS    MEMBER SERVICES
                                                  To Bottom ▽
College Start for Students ─╱ 1600

You and your parents have undoubtedly tackled all the big issues
surrounding your college education.

Or have you? How will you pay for books? Handle unexpected costs
or emergencies? Deal with the challenge of day-to-day expenses?

Here's some helpful information and products to start you on the
right track.

Information to Grow On ─╱ 1602
Basic Money Management: How to stretch your dollars ─╱ 1604
Handling Credit: The do's and don'ts of life with credit ╲─ 1606
About Insurance: What you need to know ╲─ 1608

Products to Grow With ─╱ 1610
Managing Your Money: Checking and credit cards ─╱ 1612
Staying in Touch: Cell phones, toll-free and Internet access ╲─ 1614
Insurance: Are you covered? ╲─ 1616

Other Options:
   • Return to College Start main page
   • Go to home

FAQs  GLOSSARY  CONTACT US  HOME
                                                  To Top △
```

*Fig. 17*

```
                                    Accounts | Documents | Help | Log Off  [X]
    HOME    INSURANCE   BANKING    INVESTMENTS    MEMBER SERVICES
                                                        To Bottom ▽
College Start for Students
Basic Money Management ―1700

Managing your money in college can be quite a challenge. You
might think, "Managing my money? That's easy, I have none!"

The key to getting where you want to be financially is not just making
more money. It's learning what to do with the money you already
have or earn. The articles in this section should teach you how to
keep track of your money and get yourself ahead of the financial
game.

Learn More:
  • Where Did All My Money Go? Set up a simple budget. ―1702
  • In the Real World. You're paying the bills now. ―1704
  • 10 Ways to Stay on Top of Your Finances. Get on the right track. ―1706
  • Time For a Checking Account Checkup. Save time and money. ―1708
  • Investing in Your Future. Are you following a plan? ―1710

Next:
 Find out more about the College Start Student Checking Account

Other Options:
  • Go to Handling Credit
  • Go to About Insurance
  • Go to Free Financial Profile
  • Return to College Start for Students
  • Return to College Start main page FAQs  GLOSSARY  CONTACT US  HOME
                                                        To Top △
```

METHOD OF ASSISTED EDUCATION PLANNING

CLAIM TO EARLIER APPLICATIONS

This application claims priority to co-assigned U.S. Provisional Patent Application No. 60/496,490, filed Aug. 20, 2003, entitled LIFE EVENT—COLLEGE, naming Stuart Parker as inventor, which is incorporated by reference in its entirety.

BACKGROUND

The disclosures herein relate generally to a method of planning for an education and more particularly to planning for an education with the assistance of a single source such as a membership organization.

The event of going to school, or having a dependent go to school, requires planning in order to be prepared when that time comes. Issues such as figuring out education costs, financing education costs, obtaining financial assistance, keeping in contact with family while away at school, and possibly dealing with finances and credit for the first time may need to be addressed. This may be accomplished by saving money, using investment vehicles, activating communications technologies, obtaining bank accounts and credit accounts, and seeking out different sources of information.

The decisions relating to saving and investing money need to be researched, selected, and activated. In addition, various insurance needs must be considered, communication technologies must be employed, and banking and credit accounts must be researched, selected, and activated. Last, information may need to be provided to prepare for money management and dealing with credit. Thus, a thorough education plan can involve much time consuming planning including numerous consultations and interactions with many different sources, resulting in a very inefficient process.

Accordingly, it would be desirable to provide a method of assisted education planning absent the disadvantages found in the prior methods discussed above.

SUMMARY

One embodiment, accordingly, provides a method of planning for an education with the assistance of a single source. Thus, a person can communicate with the single source for planning for financial needs for an education, various insurance protections, multiple investment products, employment of communications technologies, activation of spending tools, and information to prepare for managing money and credit. The planning, insurance protection, investment products, communication technology employment, spending tool activation, and related information are available from the single source.

A principal advantage of this embodiment is that the person planning on going to school, or a parent whose child is planning on going to school, can rely on a single source for receiving consistent advice from counselors, consistent and objective guidelines, and a variety of product mix offered by the single source.

BRIEF DESCRIPTION OF THE DRAWINGS

FIG. 1 is a schematic view illustrating a known scenario for education planning.

FIG. 2 is a schematic view illustrating an embodiment of a method for education planning.

FIGS. 5-18 are embodiments of screen shots for a website to assist a user in education planning via a network.

DETAILED DESCRIPTION

Present day planning for an education 100, FIG. 1, requires advanced planning, protection, investment, preparation, management, and payment. A person planning for an education may be a student planning for their own education, or a payor, such as a student's parent, planning for the education of the student. A person planning for an education at 102 needs to assess their personal present and estimated future financial position, provide for insurance protection for their savings, acquire investment plans, determine which school to attend and the costs associated, and may need to activate communications and spending tools for use while off at school. This process may include accessing information at 104 by in-person interviews, mail, phone, fax or on-line on the internet. Such information may be available from several sources such as a financial planner at 106, an insurance company or companies at 108, an education institution at 110, a bank at 112, various investment advisors at 114, a phone company at 116, and an internet service provider at 118, in order to provide for an education plan at 120.

A more ideal situation provides a method of planning for an education at 200, FIG. 2. A person planning for an education at 202 can access information at 204 provided as a service by a single source by in-person interviews, mail, phone, fax or electronic communication such as communication over the internet. This can be accomplished by the person using the assistance of the single source at 206. The single source 206 can be an organization which requires the user to be a member. Thus, the single source 206 assists in the planning, protection, investment, preparation, management, and payment for an education plan at 208. The education plan can be for various educational institutions including, but not limited to, pre-schools, elementary schools, preparatory schools, colleges, graduate schools, and post-graduate schools.

Figure 3:
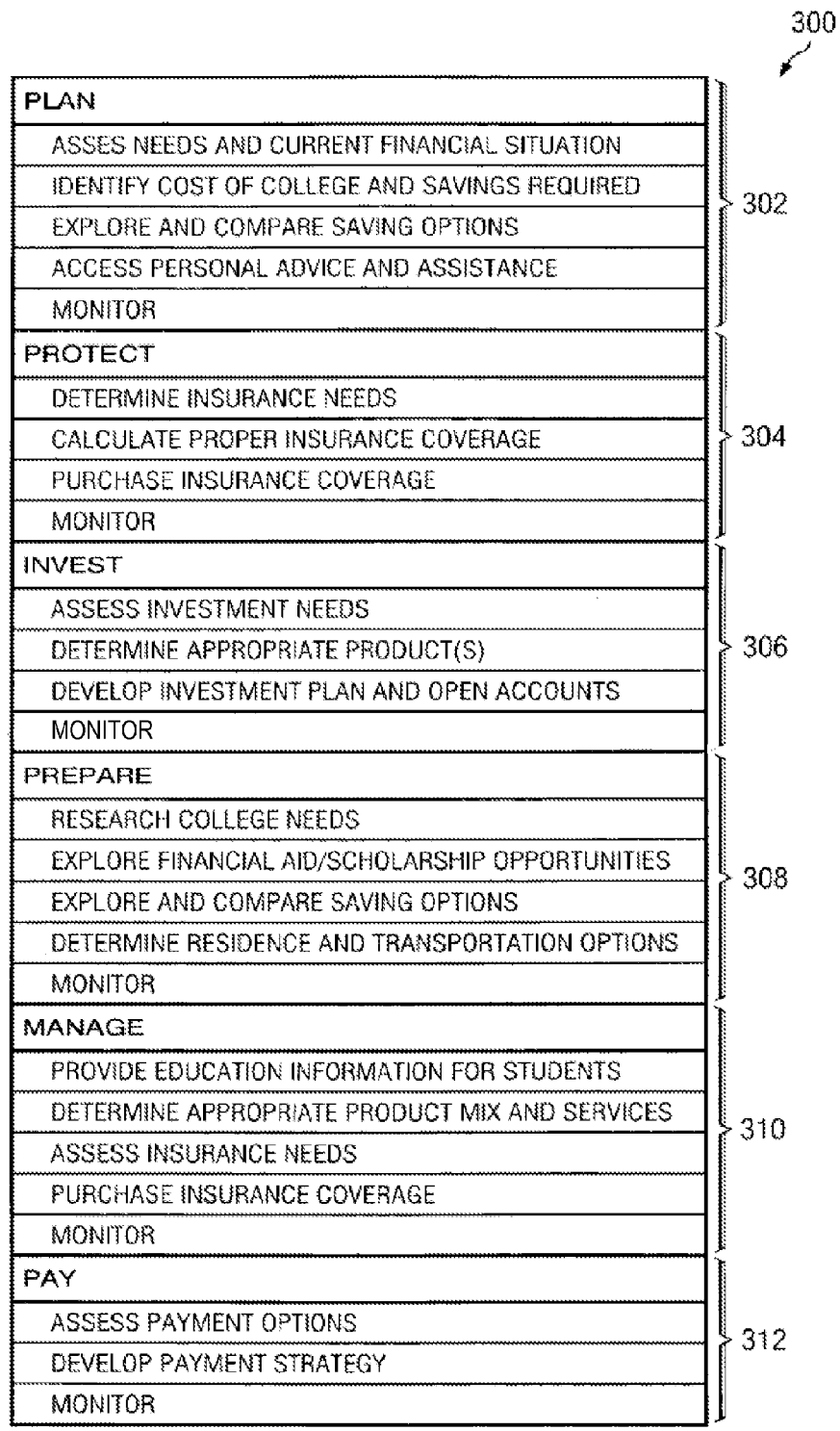
FIG. 3 is a chart view illustrating an embodiment of a method for education planning.

An overview of education planning is illustrated in FIG. 3, where planning for an education includes the single source 300 assisting the user in planning at 302, protecting at 304, investing at 306, preparing at 308, managing at 310, and paying at 312. For purposes of example only, an education plan for college is illustrated.

During the planning phase 302, the single source can assist the user in assessing their needs and current financial situation, identifying the cost of college and the savings required to meet that cost, exploring and comparing savings options, and accessing personal advice and assistance, all of which alternatives are provided by the single source. In addition, the single source will assist the user in monitoring choices made during the planning phase.

During the protecting phase 304, the single source can assist the user in determining their insurance needs, calculating the proper insurance, and purchasing insurance coverage, all of which are provided by the single source. In addition, the single source will assist the user in monitoring choices made during the protecting phase.

During the investing phase 306, the single source can assist the user in assessing their investment needs, determining the appropriate investment products to meet their investment needs, developing an investment plan, and opening investment accounts, all of which are provided by the single source.

In addition, the single source will assist the user in monitoring choices made during the investing phase.

During the preparing phase 308, the single source can assist the user in researching their college needs, exploring financial aid and scholarship opportunities, exploring and comparing savings options, and determining residence and transportation options, all of which are provided by the single source. In addition, the single source will assist the user in monitoring choices made during the preparing phase.

During the managing phase 310, the single source can assist the user in providing education information for the student, determining the appropriate mix of products and services, assessing insurance needs, and purchasing insurance coverage, all of which are provided by the single source. In addition, the single source will assist the user in monitoring choices made during the managing phase.

During the paying phase 312, the single source can assist the user in assessing payment options and developing a payment strategy, both of which are provided by the single source. In addition, the single source will assist the user in monitoring choices made during the paying phase.

Figure 4:
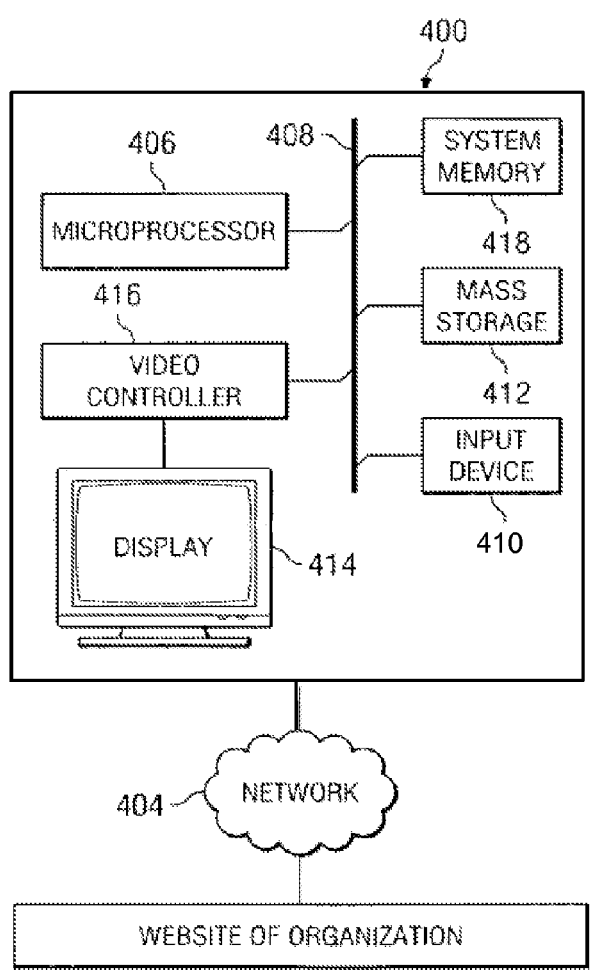
FIG. 4 is a schematic view illustrating an embodiment of a system for education planning via a network.

In one embodiment, FIG. 4, information is accessed by means of an information handling system 400 accessing a website 402 of the single source such as a membership organization, via a network 404 such as the internet. For purposes of this disclosure, an information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system can be a personal computer, a network storage device, or any other suitable device and can vary in size, shape, performance, functionality, and price. The information handling system can include random access memory (RAM), one or more processing resources such as a central processing unit (CPU) or hardware or software control logic, ROM, and/or other types of nonvolatile memory. Additional components of the information handling system can include one or more disk drives, one or more network ports for communicating with external devices as well as various input and output (I/O) devices, such as a keyboard, a mouse, and a video display. The information handling system can also include one or more buses operable to transmit communications between the various hardware components.

The information handling system 400 includes a microprocessor 406, which is connected to a bus 408. Bus 408 serves as a connection between microprocessor 406 and other components of information handling system 400. An input device 410 is coupled to microprocessor 406 to provide input to microprocessor 406. Examples of input devices include keyboards, touchscreens, and pointing devices such as mouses, trackballs and trackpads. Programs and data are stored on a mass storage device 412, which is coupled to microprocessor 406. Mass storage devices include such devices as hard disks, optical disks, magneto-optical drives, floppy drives and the like. Information handling system 400 further includes a display 414, which is coupled to microprocessor 406 by a video controller 416. A system memory 418 is coupled to microprocessor 406 to provide the microprocessor with fast storage to facilitate execution of computer programs by microprocessor 406. It should be understood that other busses and intermediate circuits can be deployed between the components described above and microprocessor 406 to facilitate interconnection between the components and the microprocessor.

Figure 5:
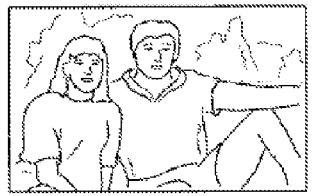

The website 402, FIG. 4, can offer a start page 500, FIG. 5, for planning for an education. The start page can include a payor link 502 for accessing a payor menu directed to a person, such as a parent, planning for the education of a student, and a student link 504 for accessing a student menu directed to a student planning for an education.

Figure 6:

Payor link 502 on the website 402, FIG. 4, can access a payor menu 600, FIG. 6, for planning for an education. The payor menu 600 can offer a plurality of options for saving for an education at 602 including links to assess needs at 604, determine the proper savings options at 606, and protect savings at 608. The payor menu 600 can further offer a plurality of options for when it is time to pay for an education at 610 including links to information on financial assistance at 612, financing options at 614, consolidating investments at 616, and cashing in investments at 618. The payor menu 600 can still further offer a plurality of options for helping a student while receiving an education at 620 including links to obtaining spending cards and spending accounts at 622, obtaining communications tools at 624, and providing insurance for the student at 626.

Assess needs link 604 on website 402, FIG. 4, can include access to an education cost calculator that can help the user determine the cost for an education when considering variables such as the number of years spent at the educational institution and whether the educational institution is private or public. There can also be access to an educational funding calculator that can help the user determine how much money to save on a periodic basis for the education when considering variables such as inflation, investment returns, the amount already saved for an education, and the age of the student the education is being planned for. Determining proper savings options link 606 can include access to a savings options page 700, FIG. 7, which includes information on education related investment vehicles which provide tax benefits such as 529 College Savings Plans at 702, Coverdell Education Savings Accounts at 704, custodial accounts, such as a Uniform Gifts to Minors Account or a Uniform Transfers to Minors Account, at 706, and prepaid tuition plans at 708. Information on savings options 702-708 includes the ability to open a plan or account from the single source. Protect savings link 608, FIG. 6, can include access to an insurance page 800, FIG. 8, which includes information on any insurance that can protect income or assets such as life insurance at 802 and disability income insurance at 804. Many other types of insurance may be available, such as liability insurance, malpractice Insurance, and property insurance. Information on insurance 802 and 804 includes the ability to purchase insurance from the single source. Insurance page 800 can also include a life insurance needs calculator 806.

Figure 9:
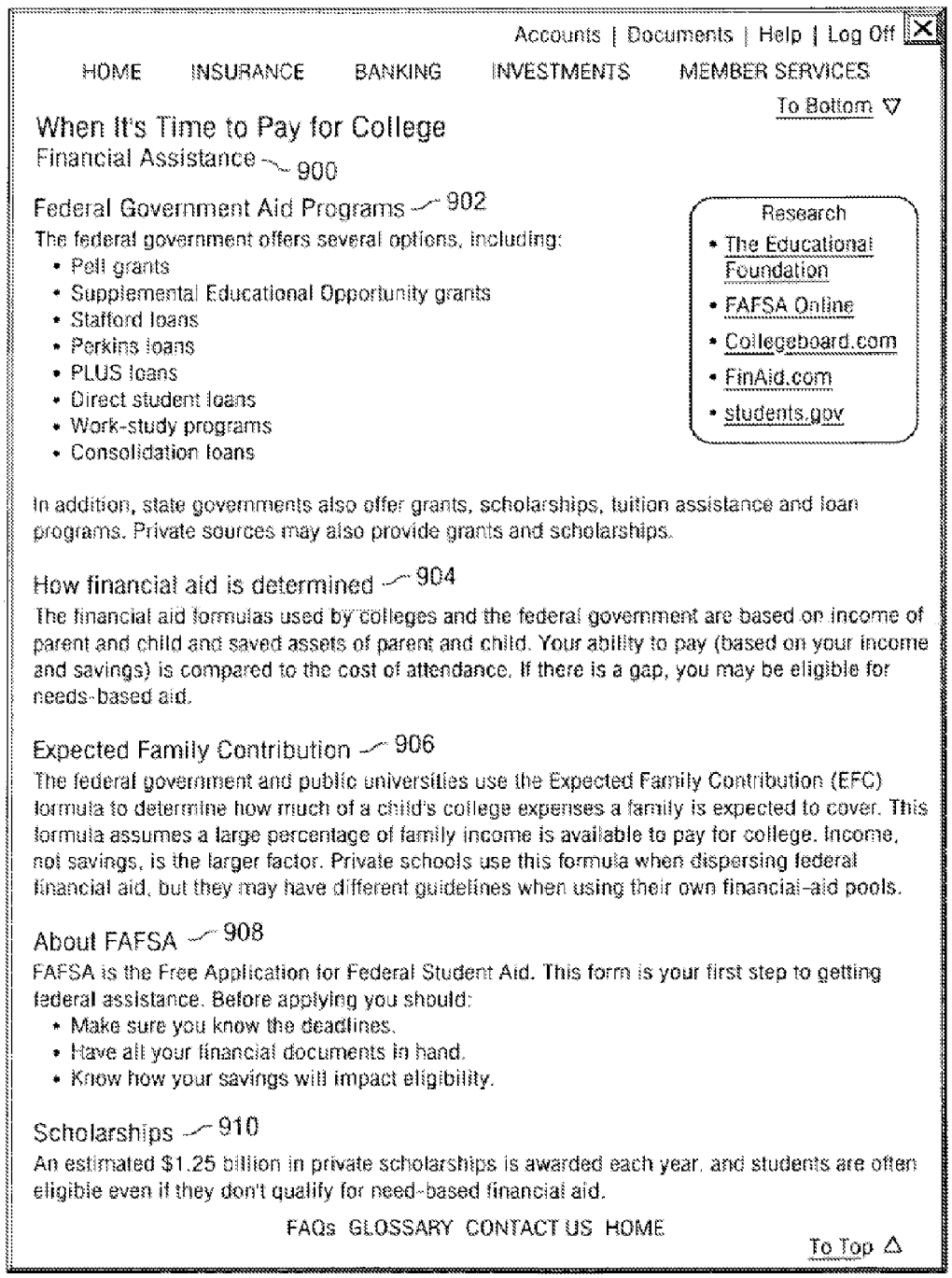
Figure 11:
Figure 12A:

Information on financial assistance link 612, FIG. 6, on website 402, FIG. 4, can include access to a financial assistance page 900, FIG. 9, which includes information on federal government aid programs at 902, how financial aid is determined at 904, expected family contributions at 906, the free application for federal student aid (FAFSA) at 908, and scholarships at 910. Financing options link 614, FIG. 6, can include access to a financing options page 1000, FIG. 10, which includes information on financing options at 1002, lines of credit at 1004 such as home equity lines of credit, and loans at 1006 such as home equity loans. Information 1004 and 1006 includes the ability to apply for and receive a line of credit or loan from the single source. Consolidating investments link 616, FIG. 6, can include access to a consolidating investments page 1100, FIG. 11, which includes information on consolidating investments into a 529 College Savings Plan at 1102, and information on consolidating investments into a money market account, such as a money market mutual fund account or a money market bank account, at 1104. Information on consolidating investments 1102 and 1104 includes information on the benefits of the different options and the ability to open a plan or account from the single source in order to consolidate investments. Consolidating investments page can further include the ability to contact a financial planner at 1106. Cashing in investments link 618, FIG. 6, can include access to a cashing in page 1200, FIGS. 12a and 12b, which includes recommendations about, and the tax and financial considerations for, cashing in education related investment vehicles which provide tax benefits such as prepaid tuitions plans at 1202, 529 College Savings Plans at 1204, Coverdell Education Savings Accounts at 1206, and custodial accounts, such as a Uniform Gifts to Minors Account or a Uniform Transfers to Minors Account, at 1208.

Figure 13:
Figure 14:
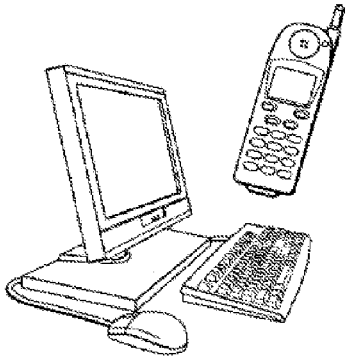
Figure 15:
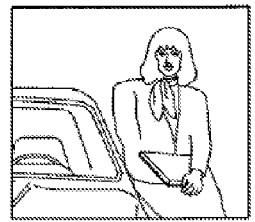

Spending card and spending account link 622, FIG. 6, on website 402, FIG. 4, can include access to a spending card and spending account page 1300, FIG. 13, which includes the ability to obtain a spending account at 1302 and a spending card at 1304, both from the single source. A spending account can be a variety of accounts, including checking, savings accounts, and prepaid spending card accounts. A spending card can be a variety of cards, including credits cards, debit cards, and prepaid cards. Information on handling credit, money management, and insurance is available at 1306. Communication tools link 624, FIG. 6, can include access to a communication tools page 1400, FIG. 14, which includes the ability to obtain an internet service provider at 1402, telephone service at 1404, and a wireless service provider at 1406, all from the single source. Providing insurance link 626, FIG. 6, can include access to an insurance page 1500, FIG. 15, which includes the ability to obtain health insurance at 1502, motor vehicle insurance at 1504, and property insurance at 1506, all from the single source.

Student link 504, FIG. 5, on the website 402, FIG. 4, can access a student menu 1600, FIG. 6, for planning for an education. The student menu 1600 can offer a plurality of information at 1602 including links to information on money management at 1604, handling credit at 1606, and insurance at 1608. The student menu 1600 can further offer a plurality of products at 1610 including links to obtaining spending accounts and spending cards at 1612, communications tools at 1614, and insurance at 1616.

Figure 18:
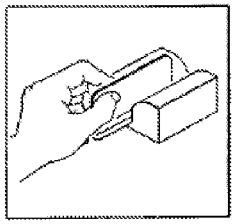

Money management link 1604, FIG. 16, on the website 402, FIG. 4, can access to a money management page 1700, FIG. 17, which includes links to information on setting up a budget at 1702, paying bills at 1704, managing finances at 1706, managing a spending account at 1708, and investing at 1710. Handling credit link 1606, FIG. 16, can access a handling credit page 1800, FIG. 18, which includes information on credit card terms at 1802, different credit card solicitations at 1804, credit card usage tips at 1806 and 1808, getting out of debt at 1810, and credit scores at 1812.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An education planning system, comprising:
   a processor; and
   a memory disposed in communication with the processor and storing processor-executable instructions, the instructions comprising instructions for:
      providing a single web browser interface for a user to plan for multiple financial needs for an education, the multiple financial needs including one or more insurance protection plans and one or more financing options for the education, wherein the single web browser interface is provided on behalf of a provider;
      obtaining user financial data from a plurality of data sources, the user financial data comprising data on income and assets used for determining the one or more financing options for the education;
      determining a current financial situation based on the user financial data;
      obtaining a selection of a school to attend for the education;
      calculating a cost for the education based on the school selection;
      determining a savings requirement to meet the calculated cost for the education based on the current financial situation;
      determining insurance protection plans for protecting the income and assets included in the one or more financing options for the education, based on the determined savings requirement to meet the calculated cost for the education, wherein:
         the insurance protection plans include at least life insurance and disability income insurance,
         the said life insurance and said disability income insurance being available from the provider of the single web browser interface, and
         the one or more financing options are distinct from the insurance protection plans;
      determining the one or more financing options for the education based on the calculated cost for the education and the current financial situation, wherein the one or more financing options are available through the provider of the single web browser interface; and
      presenting the one or more financing options and the insurance protection plans via the single web browser interface to the user.

2. The system of claim 1 wherein the planning for multiple financial needs for an education includes identifying multiple savings options for the education.

3. The system of claim 1 wherein determining insurance protection plans includes determining a need for and purchasing health insurance.

4. The system of claim 1 wherein determining the insurance protection plans includes determining a need for and purchasing motor vehicle insurance.

5. The system of claim 1 wherein determining insurance protection plans includes determining a need for and purchasing property insurance.

6. The system of claim 1 wherein determining the one or more financing options for the education includes identifying a home equity line of credit.

7. The system of claim 1 wherein determining the one or more financing options for the education includes identifying a home equity loan.

8. The system of claim 1 wherein determining the one or more financing options for the education includes identifying a 529 college savings plan.

9. The system of claim 1 wherein determining the one or more financing options for the education includes identifying a Coverdell Education Savings Account.

10. The system of claim 1 wherein determining the one or more financing options for the education includes identifying a custodial account.

11. The system of claim 1 wherein determining the one or more financing options for the education includes identifying an education related investment vehicle which provides tax benefits.

12. The system of claim 1 wherein determining the one or more financing options for the education includes identifying a money market account.

13. The system of claim 1 wherein determining the one or more financing options for the education includes identifying at least one account to open.

14. The system of claim 1, the instructions further comprising instructions for:
providing spending tools to pay for expenses associated with the education.

15. The system of claim 14 wherein providing the spending tools includes providing a spending account.

16. The system of claim 14 wherein providing the spending tools includes providing a spending card.

17. The system of claim 1, the instructions further comprising instructions for:
facilitating the user to procure communications tools associated with the education.

18. The system of claim 17 wherein the procuring communications tools includes procuring an internet service provider.

19. The system of claim 17 wherein the procuring communications tools includes procuring telephone service.

20. The system of claim 17 wherein the procuring communications tools includes procuring a wireless service provider.

21. An education planning processor-implemented method, comprising:
providing a single web browser interface for a user to plan for multiple financial needs for an education, the multiple financial needs including one or more insurance protection plans and one or more financing options for the education, wherein the single web browser interface is provided on behalf of a provider;
obtaining user financial data from a plurality of data sources, the user financial data comprising data on income and assets used for determining the one or more financing options for the education;
determining a current financial situation based on the user financial data;
obtaining a selection of a school to attend for the education;
calculating via a processor a cost for the education based on the school selection;
determining a savings requirement to meet the calculated cost for the education based on the current financial situation;
determining, via the processor, insurance protection plans for protecting the income and assets included in the one or more financing options for the education, based on the determined savings requirement to meet the calculated cost for the education, wherein:
the insurance protection plans include at least life insurance and disability income insurance,
the said life insurance and said disability income insurance being available from the provider of the single web browser interface, and
the one or more financing options are distinct from the insurance protection plans; and
determining the one or more financing options for the education based on the calculated cost for the education and the current financial situation, wherein the one or more financing options are available through the provider of the single web browser interface; and
presenting the one or more financing options and the insurance protection plans via the single web browser interface to the user.

22. The method of claim 21, wherein the planning for multiple financial needs for an education includes identifying multiple savings options for the education.

23. The method of claim 21, wherein determining insurance protection plans includes determining a need for and purchasing health insurance.

24. The method of claim 21, wherein determining the insurance protection plans includes determining a need for and purchasing motor vehicle insurance.

25. The method of claim 21, wherein determining insurance protection plans includes determining a need for and purchasing property insurance.

26. The method of claim 21, wherein determining the one or more financing options for the education includes identifying a home equity line of credit.

27. The method of claim 21, wherein determining the one or more financing options for the education includes identifying a home equity loan.

28. The method of claim 21, wherein determining the one or more financing options for the education includes identifying a 529 college savings plan.

29. The method of claim 21, wherein determining the one or more financing options for the education includes identifying a Coverdell Education Savings Account.

30. The method of claim 21, wherein determining the one or more financing options for the education includes identifying a custodial account.

31. The method of claim 21, wherein determining the one or more financing options for the education includes identifying an education related investment vehicle which provides tax benefits.

32. The method of claim 21, wherein determining the one or more financing options for the education includes identifying a money market account.

33. The method of claim 21, wherein determining the one or more financing options for the education includes identifying at least one account to open.

34. The method of claim 21, further comprising:
providing spending tools to pay for expenses associated with the education.

35. The method of claim 34, wherein providing the spending tools includes providing a spending account.

36. The method of claim 34, wherein providing the spending tools includes providing a spending card.

37. The method of claim 21, further comprising:
facilitating the user to procure communications tools associated with the education.

38. The method of claim 37, wherein the procuring communications tools includes procuring an internet service provider.

39. The method of claim 37, wherein the procuring communications tools includes procuring telephone service.

40. The method of claim 37, wherein the procuring communications tools includes procuring a wireless service provider.

41. A computer-readable non-transitory medium storing processor-executable instructions, the instructions comprising instructions for:
providing a single web browser interface for a user to plan for multiple financial needs for an education, the multiple financial needs including one or more insurance protection plans and one or more financing options for the education, wherein the single web browser interface is provided on behalf of a provider;

obtaining user financial data from a plurality of data sources, the user financial data comprising data on income and assets used for determining the one or more financing options for the education;

determining a current financial situation based on the user financial data;

obtaining a selection of a school to attend for the education;

calculating a cost for the education based on the school selection;

determining a savings requirement to meet the calculated cost for the education based on the current financial situation;

determining insurance protection plans for protecting the income and assets included in the financing options for the education, based on the determined savings requirement to meet the calculated cost for the education, wherein:
- the insurance protection plans include at least life insurance and disability income insurance,
- the said life insurance and said disability income insurance being available from the provider of the single web browser interface, and
- the one or more financing options are distinct from the insurance protection plans;

determining the one or more financing options for the education based on the calculated cost for the education and the current financial situation, wherein the one or more financing options are available through the provider of the single web browser interface; and presenting the one or more financing options and the insurance protection plans via the single web browser interface to the user.

42. The medium of claim 41, wherein the planning for multiple financial needs for an education includes identifying multiple savings options for the education.

43. The medium of claim 41, wherein determining insurance protection plans includes determining a need for and purchasing health insurance.

44. The medium of claim 41, wherein determining the insurance protection plans includes determining a need for and purchasing motor vehicle insurance.

45. The medium of claim 41, wherein determining insurance protection plans includes determining a need for and purchasing property insurance.

46. The medium of claim 41, wherein determining the one or more financing options for the education includes identifying a home equity line of credit.

47. The medium of claim 41, wherein determining the one or more financing options for the education includes identifying a home equity loan.

48. The medium of claim 41, wherein determining the one or more financing options for the education includes identifying a 529 college savings plan.

49. The medium of claim 41, wherein determining the one or more financing options for the education includes identifying a Coverdell Education Savings Account.

50. The medium of claim 41, wherein determining the one or more financing options for the education includes identifying a custodial account.

51. The medium of claim 41, wherein determining the one or more financing options for the education includes identifying an education related investment vehicle which provides tax benefits.

52. The medium of claim 41, wherein determining the one or more financing options for the education includes identifying a money market account.

53. The medium of claim 41, wherein determining the one or more financing options for the education includes identifying at least one account to open.

54. The medium of claim 41, the instructions further comprising instructions for:
providing spending tools to pay for expenses associated with the education.

55. The medium of claim 54, wherein providing the spending tools includes providing a spending account.

56. The medium of claim 54, wherein providing the spending tools includes providing a spending card.

57. The medium of claim 41, the instructions further comprising instructions for:
facilitating the user to procure communications tools associated with the education.

58. The medium of claim 57, wherein the procuring communications tools includes procuring an internet service provider.

59. The medium of claim 57, wherein the procuring communications tools includes procuring telephone service.

60. The medium of claim 57, wherein the procuring communications tools includes procuring a wireless service provider.

* * * * *